United States Patent
Tarabulski et al.

[19]

[11] Patent Number: 6,063,350

[45] Date of Patent: May 16, 2000

[54] REDUCING NO$_X$ EMISSIONS FROM AN ENGINE BY TEMPERATURE-CONTROLLED UREA INJECTION FOR SELECTIVE CATALYTIC REDUCTION

[75] Inventors: Theodore J. Tarabulski, Brewster, N.Y.; Curtis J. Knapper, New Fairfield, Conn.; Jeremy D. Peter-Hoblyn, Cornwall, United Kingdom; James M. Valentine, Fairfield, Conn.

[73] Assignee: Clean Diesel Technologies, Inc., Stamford, Conn.

[21] Appl. No.: 09/170,476

[22] Filed: Oct. 13, 1998

Related U.S. Application Data

[63] Continuation-in-part of application No. 08/831,209, Apr. 2, 1997, Pat. No. 5,976,475.

[51] Int. Cl.[7] .................................................. B01J 8/00
[52] U.S. Cl. ...................... 423/239.1; 423/212; 423/235
[58] Field of Search .................................. 423/212, 235, 423/239.1

[56] References Cited

U.S. PATENT DOCUMENTS

| | | | |
|---|---|---|---|
| 2,540,663 | 2/1951 | Garey | 299/121 |
| 4,107,272 | 8/1978 | Mori et al. | 423/239 |
| 4,138,469 | 2/1979 | Kato et al. | 423/239 |
| 4,268,488 | 5/1981 | Ginger | 423/239 |
| 4,393,031 | 7/1983 | Henke | 423/239 |
| 4,964,471 | 10/1990 | Michalik et al. | 169/57 |
| 5,021,227 | 6/1991 | Kobayashi et al. | 423/212 |
| 5,116,579 | 5/1992 | Kobayashi et al. | 422/111 |
| 5,184,462 | 2/1993 | Schatz | 60/274 |
| 5,189,876 | 3/1993 | Hirota et al. | 60/286 |
| 5,209,061 | 5/1993 | Takeshima | 60/278 |
| 5,260,042 | 11/1993 | Martin | 423/235 |
| 5,277,135 | 1/1994 | Dubin et al. | 110/345 |
| 5,425,928 | 6/1995 | Martin et al. | 423/235 |
| 5,431,893 | 7/1995 | Hug et al. | 423/234.1 |
| 5,522,218 | 6/1996 | Lane et al. | 60/274 |
| 5,620,142 | 4/1997 | Elkas | 239/518 |
| 5,753,188 | 5/1998 | Shimoda et al. | 442/108 |
| 5,809,775 | 9/1998 | Tarabulski et al. | 60/274 |
| 5,827,490 | 10/1998 | Jones | 423/239.1 |

*Primary Examiner*—Tom Dunn
*Attorney, Agent, or Firm*—Ware, Fressola, Van Der Sluys & Adolphson LLP

[57] ABSTRACT

A safe, reliable SCR system for reducing NO$_x$ emissions from a lean-burn internal combustion engine utilizes urea in aqueous solution. A modular assembly is provided for mounting inside a urea reagent tank enables controlled feeding an aqueous urea solution to an injector. The assembly includes a reagent quality sensor, a reagent temperature sensor, a reagent level sensor and a pump.

11 Claims, 5 Drawing Sheets

REDUCING NO$_x$ EMISSIONS FROM AN ENGINE BY TEMPERATURE-CONTROLLED UREA INJECTION FOR SELECTIVE CATALYTIC REDUCTION

RELATED APPLICATION

This application is a continuation in part of commonly-owned, U.S. patent application Ser. No. 08/831,209, filed Apr. 2, 1997, now U.S. Pat. No. 5,976,475 the entire disclosure of which, including the text of the references cited therein are hereby incorporated by reference.

TECHNICAL FIELD

The invention relates to means and methods that enable the safe and reliable reduction of nitrogen oxides (NO$_x$) emissions while permitting a diesel or other lean-burn engine to operate efficiently.

Diesel and lean-burn gasoline engines provide advantages in fuel economy, but produce both NO$_x$ and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase NO$_x$.

Current and proposed regulations challenge manufacturers to achieve good fuel economy and reduce particulates and NO$_x$. Lean-burn engines will be necessary to achieve the fuel economy objective, but the high concentrations of oxygen in the exhaust renders typical exhaust gas catalyst systems ineffective for reducing NO$_x$.

SCR (selective catalytic reduction) has been available for years in some contexts for reducing NO$_x$. To date, however, SCR has depended on the use of ammonia, which has safety problems associated with its storage and transport. Urea is safer, but has not been practical for many SCR applications—particularly mobile NO$_x$ sources—due to the difficulty in converting it from a solid or an aqueous form to its active gaseous species, typically NH$_i$ and HNCO radicals.

From a regulatory standpoint there must be some means of assuring that the system is operating effectively. Mobile sources, such as cars and trucks, face sever temperature variations and something must be done to assure that the system operates effectively—despite high or low ambient temperatures or temperature variations due to transient operating conditions.

There is a current need for a safe, economical and effective answer to the problems associated with SCR, particularly for mobile diesel and other lean-burn engines.

BACKGROUND ART

Where SCR catalysts are employed to limit NO$_x$ emissions from diesel engines, one has to deal with either the dangers of ammonia or risk fouling the catalysts under most conditions. In this regard, see R. J. Hulterman; A Selective Catalytic Reduction Of NO$_x$ from Diesel Engines Using Injection Of Urea; Ph.D. thesis, September 1995. Hulterman describes a number of technical challenges including clogging of atomizers, decomposition problems and system dynamics. Similarly, in SAE Paper No. 970185, entitled "Transient Performance of a Urea DeNOx Catalyst for Low Emissions Heavy-Duty Diesel Engines", it is indicated that the injection nozzles must protected from undue heat.

The limited attempts to use urea SCR for diesel engines have required the use of large pyrolization chambers or other devices following the point of urea introduction into the exhaust, as disclosed in U.S. Pat. No. 5,431,893, to Hug, et al. Equipment of this type highlights the known problems with urea. Once introduced into diesel exhaust, urea takes time to break down and may cause nozzle plugging as conventionally introduced and still as proposed in that disclosure. To protect the catalyst from fouling, Hug, et al., propose bulky equipment. In addition, this disclosure highlights the necessity of maintaining the urea solution at a temperature below 100° C. to prevent decomposition prior to passage through the nozzle. They propose the use of moderate urea pressures when feeding the urea and find it necessary to have alternative means to introduce high-pressure air into the feed line when it becomes plugged. The nozzles employed by Hug, et al., are apparently capable of producing moderately-fine sprays, the dispersion of which is aided by auxiliary air, but the droplets require a large pyrolization channel. See also, WO 97/01387 and European patent application 487,886 A1.

Each of the points of caution by these references about the difficulties of using urea with SCR systems, especially for mobile sources, points to the trouble the art has had and continues to have.

The art is awaiting the development of a process and apparatus that would permit the use of urea in an SCR process simply, reliably, economically and safely.

DISCLOSURE OF INVENTION

It is an object of the invention to provide a safe, reliable SCR system for reducing NO$_x$ emissions from an internal combustion engine.

It is another object of the invention to eliminate the safety problems associated with the storage and handling of ammonia for mobile uses.

It is still another object of the invention to enable the use of urea for SCR NO$_x$ reduction without plugging of feed lines due to hydrolysis of the urea.

It is still another object of the invention to enable the use of urea for SCR NO$_x$ reduction without plugging of feed lines clue to freezing of the urea solution.

It is yet another object of the invention to enable a use of urea for SCR that avoids wetting of or solids deposition on the catalyst.

It is another, more specific, object of one aspect of the invention to provide a simple, robust, SCR system capable of rapid response time in order to meet transient conditions prevailing in diesel engines.

It is a yet further and more specific object of the invention to enable the use of urea in an SCR system that enables treatment of exhaust gas at temperatures between 180 and 650° C.

It is a yet further and more specific object of the invention to enable the use of urea in an SCR system that enables integration with an engine management system (EMS), thereby avoiding the need for an extra controller.

It is a yet further, more specific object of the invention to enable the use of urea in an SCR system with a dedicated controller including the features necessary for SCR, using either dedicated sensors or sharing where possible with the EMS.

It is yet another specific object of the invention to provide a simple mechanical device for accomplishing the above objects and preferably to enable close coupling of the reagent injection means and the SCR catalyst.

It is yet another specific object of the invention to provide a simple mechanical device for monitoring and maintaining the quality of the urea solution.

It is yet another specific object of the invent on to provide a control system that enables switching to alternative $NO_x$ control strategies when anomalies in urea solution quality or supply are sensed to assure continuous $NO_x$ reduction.

It is yet another specific object of the invention to provide a system that, while being specifically designed for urea solutions can be employed with similar benefits for $NO_x$ reducing reagents other than urea, including hydrocarbon liquids, such as alcohols or the like.

These and other objects are achieved by the present invention, which provides an improved method and a modular apparatus for $NO_x$ reduction.

The method of the invention reduces the emissions of $NO_x$ from a lean-burn engine having associated therewith an exhaust system having an exhaust passage for carrying exhaust gases containing $NO_x$ to a reactor effective for selective catalytic $NO_x$ reduction, and in one embodiment comprises: monitoring the quality, temperature and level of urea solution in a storage vessel; generating sensor signals representative of the quality, temperature and level of urea in the storage vessel; comparing the sensor signals to reference values; generating control signals representative of the results of the comparison; responsive to the control signals, controlling the flow of urea solution, either clearing it from injectors and feed lines or injecting it into the exhaust gases at a rate sufficient for SCR; and passing the exhaust gas through an SCR reactor.

Other parameters, such as pressure in the feed lines can also be monitored and employed to facilitate control. Any or all of these control parameters can be processed by dedicated signal processors or by a main engine control unit where direct benefit can be had of reference to a comprehensive engine parameter map or a dedicated controller can access important data over a vehicle communications link/ network.

In one embodiment, a heater is provided for temperature maintenance of the urea solution.

In another embodiment, a return is employed as a means for temperature maintenance of the urea solution. Alternatively, a heat exchange fluid such as air or engine coolant can be passed in heat exchange contact with the injector.

In a preferred embodiment, an excessively, low temperature for the urea in the storage vessel, will cause a heater to start to maintain the temperature of the solution within a desired range. It is preferred in this mode of operation, to also monitor the availability of battery or auxiliary power to run the heater. If it is determined that insufficient power is available and the engine is off, injectors and feed lines will be drained to avoid freezing. Upon startup, if it is determined that reagent will not flow due to freezing or the like, the engine control system can provide a warning to the operator and will preferably control engine operation to maintain low $NO_x$ levels without the use of reagent, e.g., by exhaust gas recirculation, engine timing or derating to produce less power. Upon sensing reagent in a flowable condition, the controller will then switch back to SCR mode which permits maximum engine performance. Alternatively, startup may be prohibited until auxiliary power is provided and the reagent has thawed.

In a related embodiment, the quality of the urea solution will be monitored and if it fails testing on one or more criteria, the injectors will be shut off to prevent operation with a defective solution. In this mode, the engine control system can provide a warning to the operator and will preferably control engine operation to maintain low $NO_x$ levels without the use of reagent, e.g., by exhaust gas recirculation, engine timing or derating to produce less power. The system will preferably warn the operator of a potential loss of power and the operator will be required to replace the reagent with a standard reagent which is detected by the onboard sensor.

The apparatus in one embodiment comprises: a storage vessel; an assembly for feeding an aqueous urea solution from the storage vessel through a line to an injector, the assembly comprising a reagent quality sensor, a reagent temperature sensor, a reagent level sensor and a pump; injector means for injecting urea solution into the exhaust gases at an exhaust gas temperature effective for SCR; a line extending from the storage vessel to the injector, and exhaust passage means leading from the injector means to an SCR reactor.

Preferably, means are provided for returning urea solution from the injector to the storage vessel, the rates of feed and return being sufficient to supply urea as needed to the exhaust gases for $NO_x$ reduction and maintain the temperature of the urea solution sufficiently low such that it is not allowed to sufficient time at elevated temperature to hydrolyze the urea to such an extent that solids precipitate (e.g., below about 140° C).

It is preferred to include suitable means for effecting control as necessary to perform the process as described above and as more fully set out below.

BRIEF DESCRIPTION OF THE DRAWINGS

The invention will be better understood and its advantages more apparent from the following detailed description, especially when read in light of the accompanying drawings, wherein.

DETAILED DESCRIPTION

In this description, the term lean-burn engine is meant to include engines that can be operated with an inlet oxygen concentration greater than the amount required for stoichiometric (or chemically correct) combustion of a hydrocarbon fuel, e.g., at least 1% by weight excess oxygen.

The term "engine" is meant in the broad sense to include all combustors which combust hydrocarbon fuels to provide heat, e.g., for direct or indirect conversion to mechanical or electrical energy. Internal combustion engines of the Otto, Diesel and turbine types, as well as burners and furnaces, are included and can benefit from the invention. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels and specifically includes gaseous fuels, e.g., methane, propane, butane and the like.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The term "urea" is meant to encompass urea in all of its commercial forms, including those containing: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine and tricyanourea. Typically, the commercial form of urea will consist essentially of urea, containing 95% or more urea or an aqueous solution containing urea of this purity.

Aqueous solutions of urea can be employed up to their solubility limits. Typically, the aqueous solution will contain from about 2 to about 65% reagent based on the weight of the solution. It is an advantage of the invention that it enables the use of concentrated urea solutions. The prior art has taught that dilute solutions of urea are necessary to avoid problems with precipitation of breakdown products. The invention enables utilizing urea to maximum advantage without the usual concerns of ammonia or the concerns of line and nozzle plugging. Concentrated solutions are preferred because they limit the amount of water that must be stored, transported, vaporized and protected from freezing in the winter. Typical concentrations of urea are within the range of from about 25 to about 50% e.g. from about 30 to about 35%. A preferred concentration for mobile uses is 32.5% urea which advantageously exhibits the lowest freeze point without precipitation of urea.

The urea can be stored in the form of a solution or dry in a canister. When stored dry, water is passed in contact with the urea as needed to prepare a solution. In this manner the solution concentration can be varied from near saturation (to minimize water storage and use) or to any concentration suitable for a vehicle or stationary installation. It will be desired in some circumstances to provide heaters for the water and/or urea solution storage to prevent freezing or to reduce time for gasification. Likewise, it may be useful to employ antifreeze materials.

Figure 1:
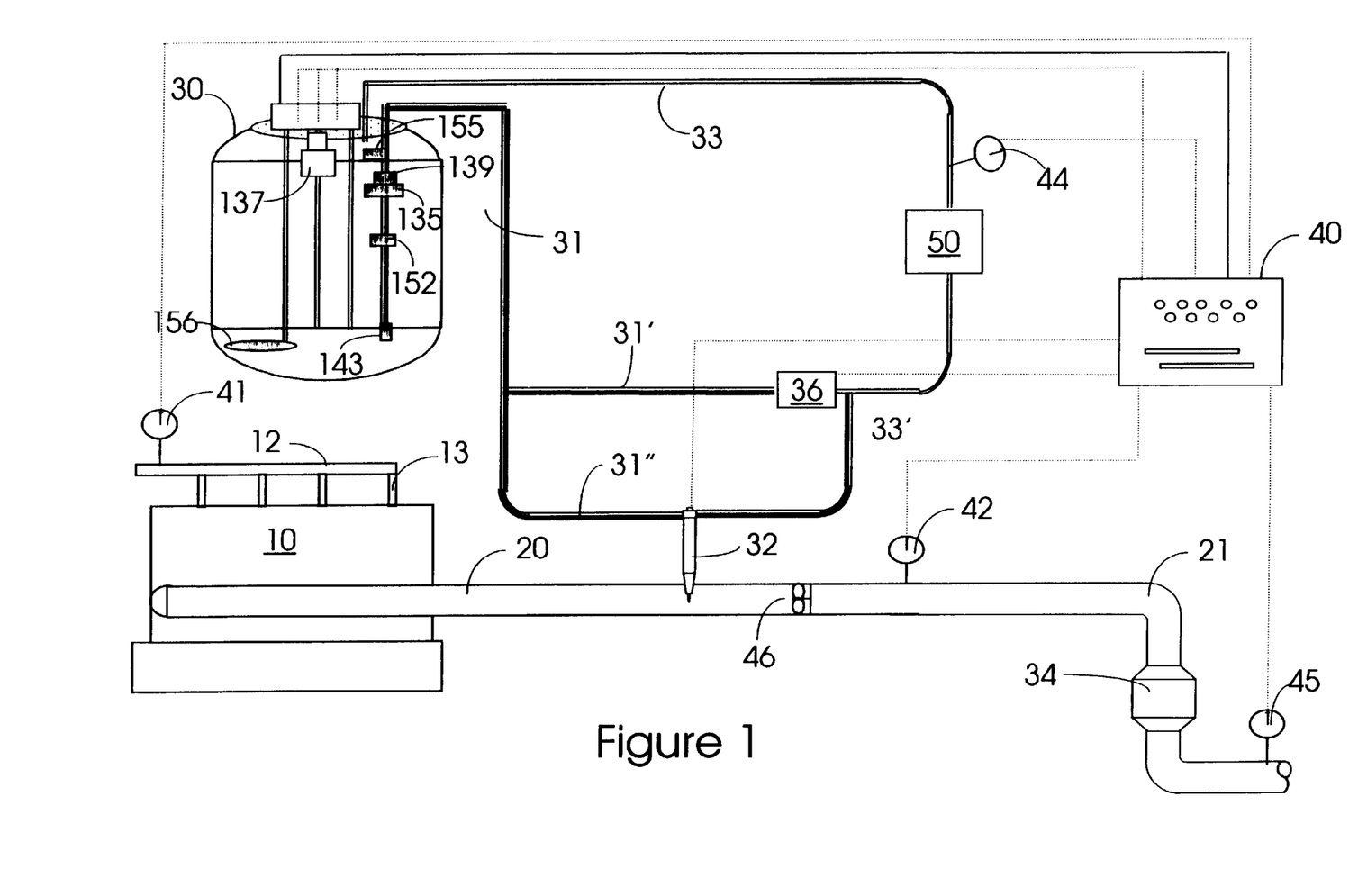
FIG. 1 is a flow diagram showing principal components of one embodiment of the invention wherein an injector is cooled by returning a portion of $NO_x$-reducing reagent (such as aqueous urea solution)

Reference is made to the FIG. 1, which illustrates in schematic form, one embodiment of the invention. Briefly, diesel engine 10 is fed fuel via lines 12 and injectors 13. The engine produces exhaust gases containing $NO_x$ that are passed through exhaust pipe 20. Urea solution is fed from vessel 30 to exhaust line 20 by one or more injectors, like 32. The exhaust gases are then passed through SCR reactor unit 34. The process is preferably controlled by means of a controller 40, which can be integrated with an engine management system (EMS), thereby avoiding the need for an extra controller, or designed to stand alone and/or communicate with the EMS or a vehicle management system (VMS). In an embodiment not shown the urea solution is introduced into the exhaust between exhaust valves of the engine and a turbocharger exhaust turbine.

FIG. 1 shows a reagent injector system employing a feed line, e.g., a common rail 31, with a return to the supply via spill line 33. This system maintains a continuous flow of reagent between storage vessel 30 and injector 32. The term injector is used herein to describe any device capable of controlling flow of urea solution from the rail 31 to the exhaust gases. The injector can be either a high-pressure or a low-pressure device as will be explained in more detail below.

Among the low-pressure devices are any of the available low-pressure liquid distribution means, such as a mechanical atomizer of the type employed to Inject liquid fuels for internal combustion engine use, spray paints, a sonic atomizer, a simple valve extending to a tube with a dispersion device comprising a plurality of orifices to provide a fine spray, or a pintle-controlled nozzle. Preferred injectors of this type w ill operate at reasonably elevated pressures of from about 10 to about 100 psig, e.g., form about 30 to 50 psig. Air-powered nozzles can be employed, but it is preferred to operate them with a minimum of air to reduce the cost of the equipment and the effect air has on cooling the exhaust. In circumstances where neither air supply nor its cooling effect are unacceptable design compromises, air can be employed to cool the injector and/or aid inject on of urea solution.

One preferred form of injector is illustrated in U.S. patent application Ser. No. 09/164,304 filed Oct. 1, 1998 and entitled FLUID-COOLED INJECTOR. This injector has a pintle controlled injection orifice and provides a impact plate directly outside the orifice such that the spray from the orifice will impact the plate and become rapidly, finely dispersed. A solenoid can be employed to electrically operate this injector and other preferred forms. Both the frequency of opening and the duration of any open position can be controlled. The percentage open time can conveniently be from 0 to 80%. The frequency can conveniently be from 5 to 30 hertz. It will be understood that a wide range of other values can be employed. It is an advantage of the invention that control of the injector is so flexible and can be so rapid as to facilitate rapid adjustment to transient engine operating conditions.

Figure 2:
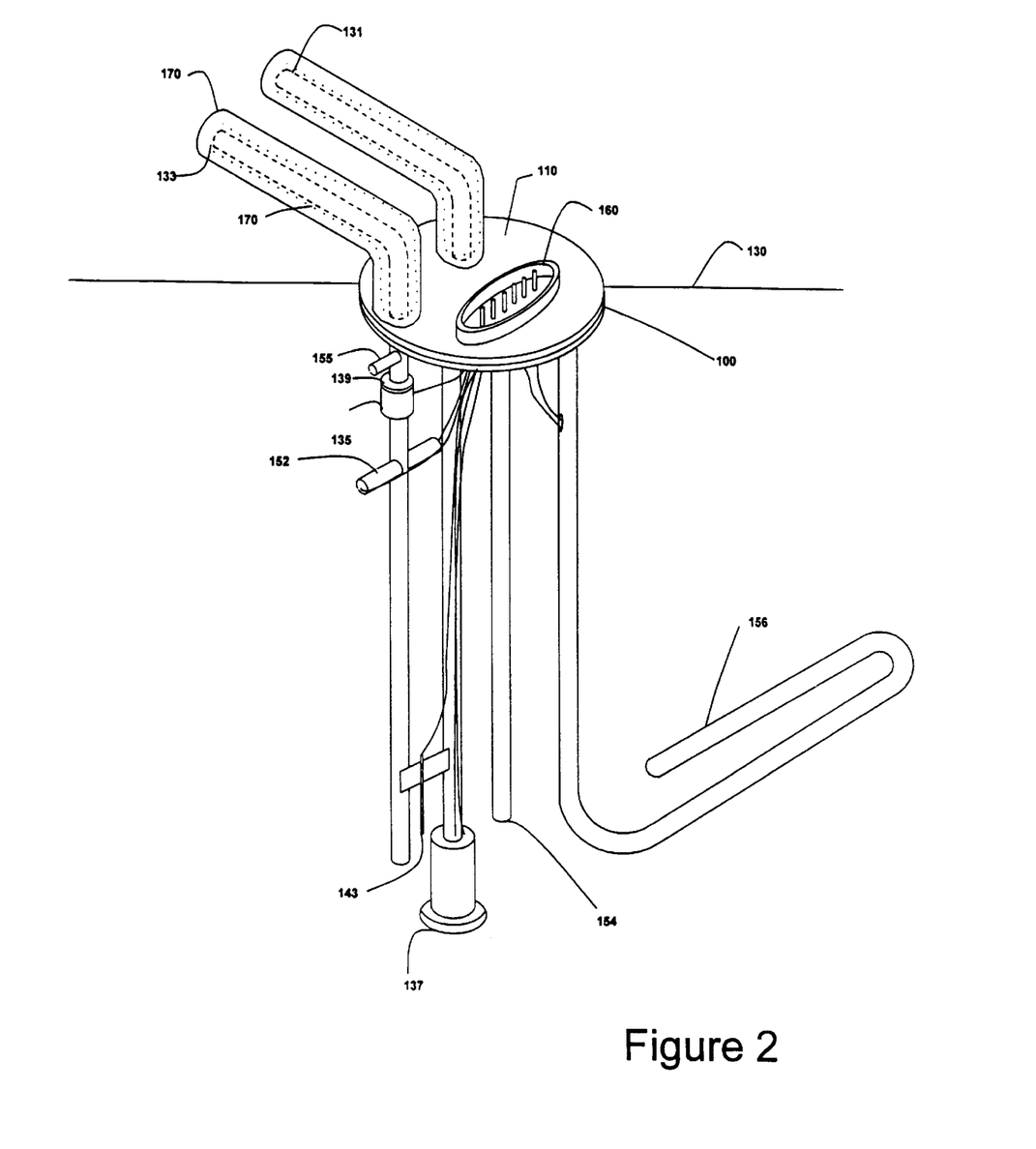
FIG. 2 is a preferred form of reagent flow and control module according to the invention.
Figure 3:
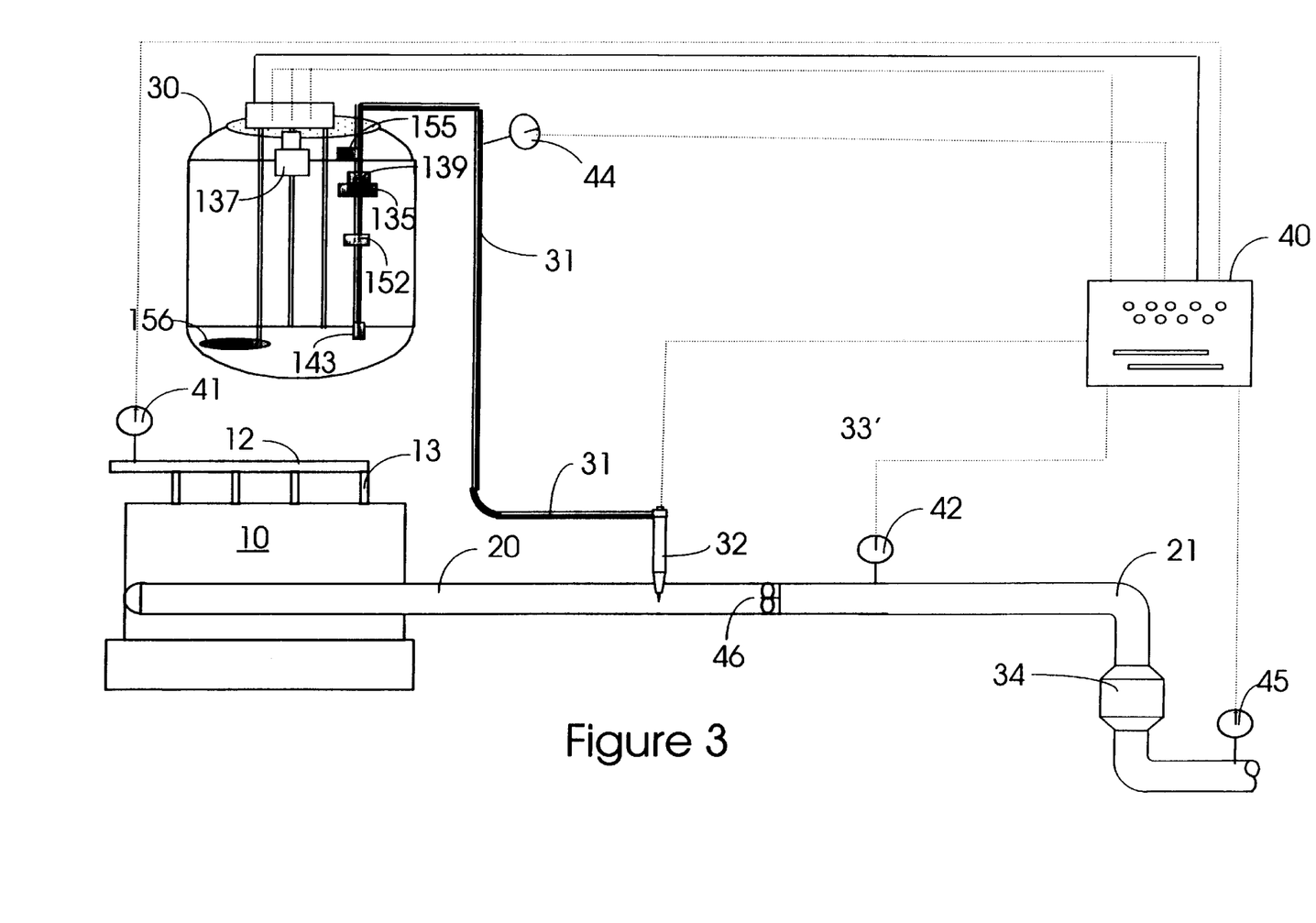
FIG. 3 is an alternative embodiment of the invention where a return line for urea flow is eliminated.
Figure 4:
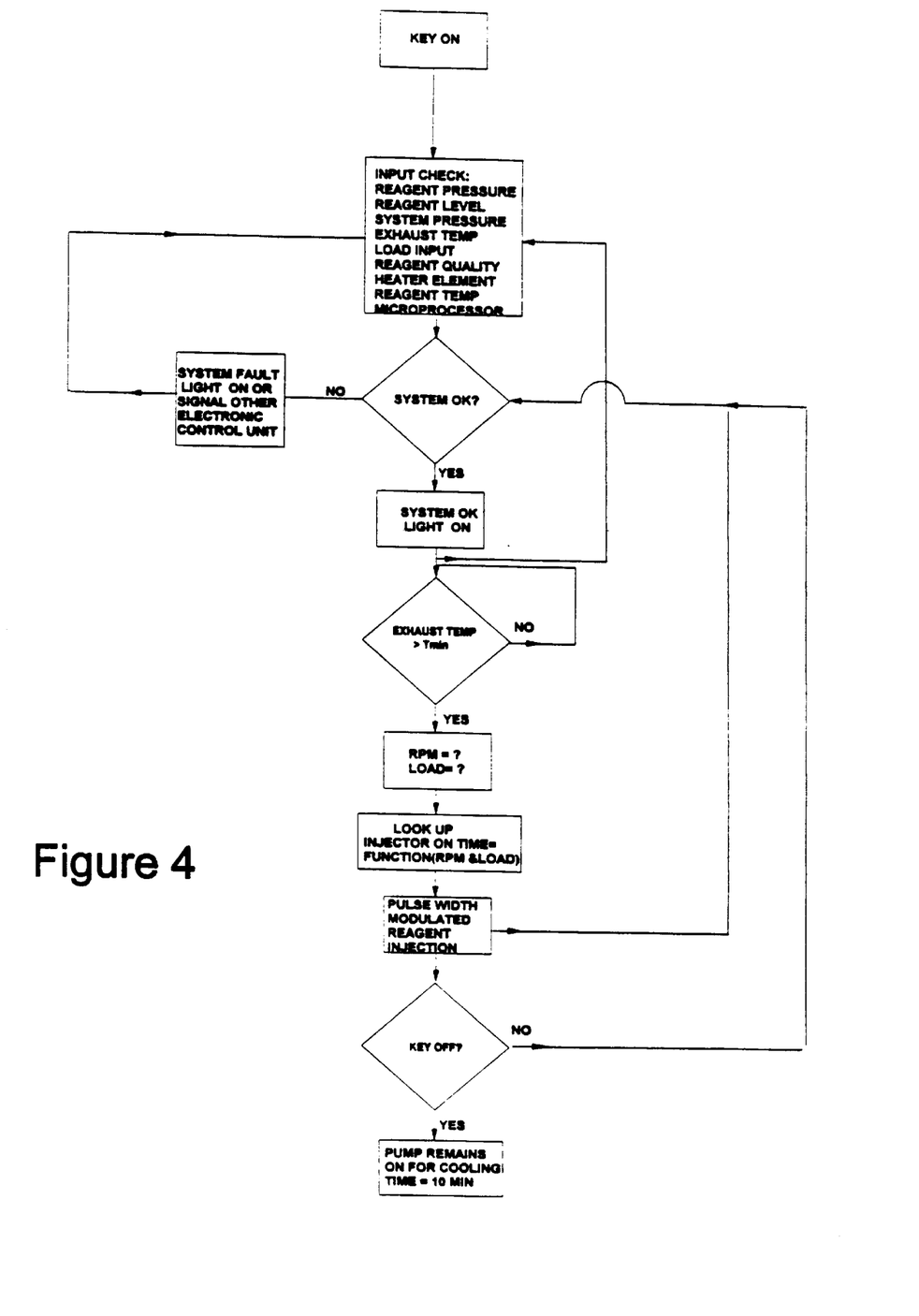
FIG. 4 is a preferred control logic diagram according to the invention.

FIG. 2 is directed to a preferred form of the invention which provides a modular assembly 100 which is designed to be supported by and fit within a urea storage vessel of an apparatus of the type illustrated in FIG. 1. FIG. 2 is a preferred form of urea flow and control module according to the invention. FIG. 4 is a preferred control logic diagram according to the invention. In the embodiment of FIGS. 1 and 2, reagent is circulated through the injector to maintain it at a suitably cool operating temperature, unless the control system notes an anomaly and stops circulation. In most cases, though, circulation should be maintained constantly even though injector operation may be stopped. If flow is ever stopped during operation, the heat of the exhaust might cause damage to the injector unless separate means are provided to cool the injector. FIG. 3 shows an alternative embodiment of the invention which does not provide for return flow of reagent.

The invention enables utilization of aqueous solutions of urea in place of ammonia for SCR $NO_x$ reduction in a manner that avoids plugging the solution feed and injector system with deposits of urea hydrolysis products or wetting or forming solid deposits on the catalyst. It is an advantage of the invention that, while the module is specifically designed for urea solutions, it can be employed with similar benefits for $NO_x$ reducing reagents other than urea, including hydrocarbon liquids, such as lower aliphatic alcohols like methanol, ethanol, propanol, or the like.

The module 100 is shown to include a mounting plate 110 which, in the preferred embodiment, has the dual function of providing support for the various components comprised in it. The modular assembly 100 is designed for mounting inside a urea reagent tank (e.g., as illustrated schematically in FIG. 1 and shown cut away in FIG. 2) and enables controlled feeding an aqueous urea solution to an injector. The assembly includes a reagent quality sensor 152, a reagent temperature sensor 143, a reagent level sensor 154 and a pump 137. Preferably, it also includes a pressure regulator 135, pressure sensor 139 and heater 156. The pressure sensor can provide a control action directly, such as where it is a switch, or can provide a signal for processing by a control computer. Feed line 131 is provided for feeding urea solution from the vessel 130 to a suitable injector 132. Return line 133 is provided for returning urea solution from the injector 132 back to the vessel 130. All reagent lines, including 131, 133 and others are optionally insulated and/or heated. FIG. 2 illustrates insulation 170, which can optionally be heated, and insulation on lines 131 and 133. Electrical feeds servicing the various components of the module are preferably collected at a single connector 160 or an equivalent arrangement of multiple connectors, e.g., one or more for electronic signals, and one or more for electric power.

Check valve 155 permits reagent solution to return through line 133, but prevents reverse flow reagent from the tank. When a control signal is given to drain the injectors and lines, the pump 137 is reversed and air is pulled through the check valve to enable the desired flow. Mounting the pump above the intended fluid level protects it from damage from freezing.

In-line mixing means are preferably employed to assure good distribution of urea solution within the exhaust gases, especially when low-pressure injectors are employed. Distribution is important because high concentrations of urea solution can cause localized cooling and this can result in droplets of water or particles of urea or pyrolysis products surviving and then impacting the SCR catalyst. One suitable device is shown as a propeller 46. Alternatively, a foraminous body, mist eliminator, static mixer, particulate trap or other like device having a mixing capability can be employed. The Figure also shows bend 21 in exhaust pipe 20, to act as a guard against liquid or solid urea or urea residues from contacting the catalyst in SCR reactor 34.

The embodiment illustrated in FIG. 1 includes a rail pressure sensor 35 and a pressure-regulating valve 36. Pressure within the rail and return lines by valve 36 and pump 37, in response to control signals provided by controller 40. It will be noted that pressurized lines 31,31' and 31" are shown in FIG. 1 as darker than the unpressureized return lines 33 and 33'. Optionally, a heat exchanger 50 can be employed in line 33 to cool the urea solution in the case of overheating. Lines 38 and 38' between the pump 37 and vessel 30 provide agitation as needed to the urea solution. And, as indicated in the discussion of FIG. 2, any of the lines can be insulated and/or heated.

Line 33 can be eliminated in embodiment, where separate cooling means are provided for the injector. One arrangement for this embodiment is shown in FIG. 3. The return line has been eliminated and means are provided to measure the temperature in line 131. The pressure regulator 135, pressure sensor 139, reagent temperature sensor and reagent quality sensor are conveniently located on the feed line 131.

Controller 40 can be integrated with an EMS for the engine 10 to avoid the need for several different controllers and to utilize existing wiring harnesses and sensors to the extent possible. Alternatively, a dedicated controller including the features necessary for SCR can be employed using either dedicated sensors or sharing where possible with the EMS. Various sensors are shown and function to sense various operation parameters and generate operation signals representative of the sensed parameters. The operation signals are then sent to the controller, which compares them to reference values, computes one or more control signals and sends the control signals to one or more devices being controlled.

Figure 5:
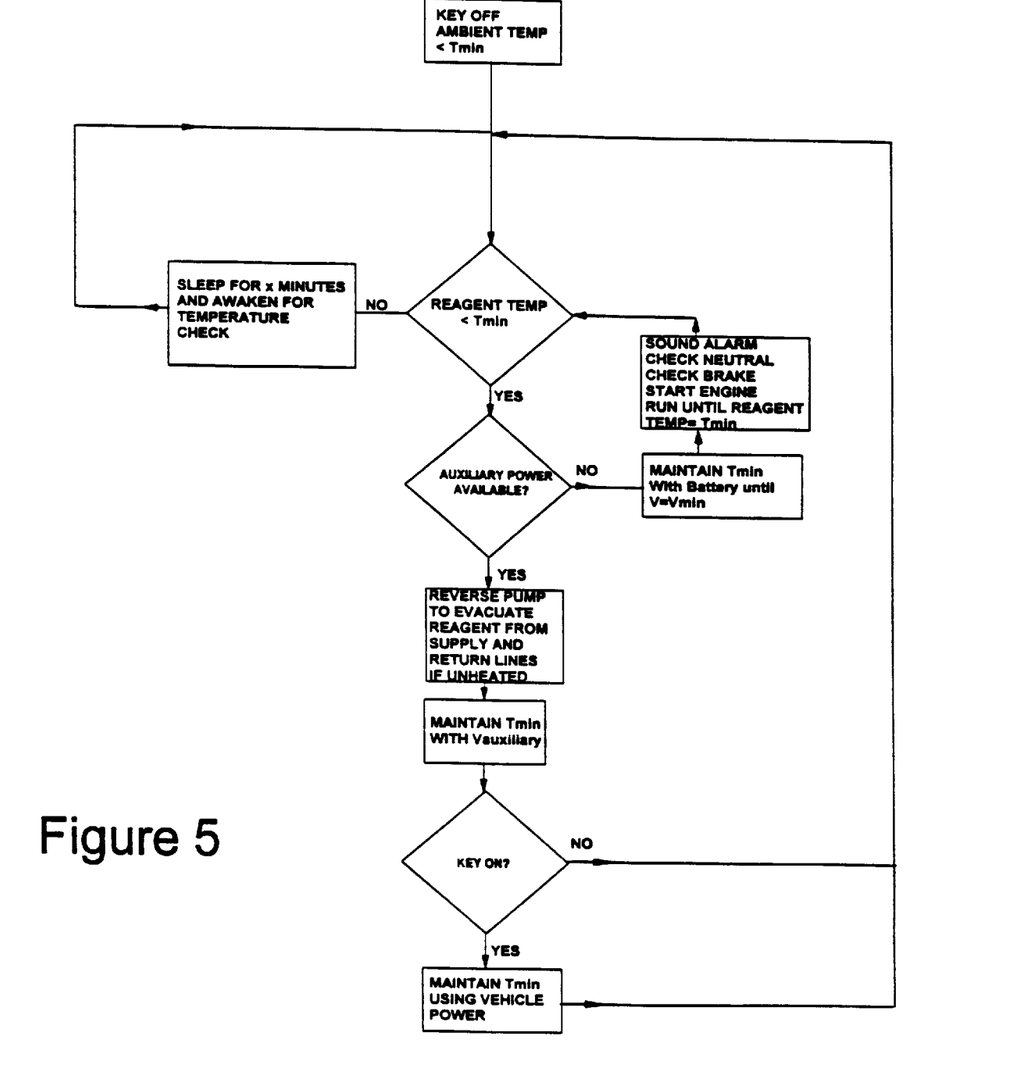
FIG. 5 is a control logic diagram illustrating specific logical sequences related to reagent temperature.

FIG. 4 is a preferred control logic diagram according to the invention. The method of the invention reduces the emissions of $NO_x$ from a lean-burn engine having associated therewith an exhaust system having an exhaust passage for carrying exhaust gases containing $NO_x$ to a reactor effective for selective catalytic $NO_x$ reduction. The process preferably comprises: monitoring the quality, temperature and level of urea solution in a storage vessel. Based on these sensed parameters, sensor signals are generated representative of the quality, temperature and level of urea in the storage vessel. The sensor signals are then compared to reference values and control signals are generated representative of the results of the comparison. FIG. 5 is a control logic diagram illustrating specific logical sequences related to reagent temperature. In the control diagrams the symbol V indicates measured voltage or other indicator of available electrical power.

Responsive to the control signals, the flow of urea solution is controlled, either clearing it from injectors and feed lines or injecting it into the exhaust gases at a rate sufficient for SCR; and passing the exhaust gas through an SCR reactor.

Other parameters, such as pressure in the vessel and/or feed lines can also be monitored and employed to facilitate control. Any or all of these control parameters can be processed by dedicated signal processors or by a main engine control unit where direct benefit can be had of reference to a comprehensive engine parameter map.

In the preferred embodiment, a heater is provided for temperature maintenance of the urea solution.

In a preferred embodiment, an excessively low temperature for the urea in the storage vessel, will cause a heater to start to maintain the temperature of the solution within a desired range. It is preferred in this mode of operation, to also monitor the availability of auxiliary or battery power to run the heater 156. If it determined that insufficient power is available, injectors and feed lines will be drained to avoid freezing. In this mode, the engine control system can provide a warning to the operator and will preferably control engine operation to maintain low $NO_x$ levels without the use of reagent, e.g., by exhaust gas recirculation, engine timing or derating to produce less power.

In a related embodiment, the quality of the urea solution will be monitored and if it fails testing on one or more criteria, the injectors are preferably stopped. In this mode, the engine control system can provide a warning to the operator and will preferably control engine operation to maintain low $NO_x$ levels without the use of reagent, e.g., by exhaust gas recirculation, engine timing or derating to produce less power. Before the SCR system can be operated again, and full engine power restored, the anomaly must be corrected.

FIG. 1 shows sensor 41 for engine, sensor 42 for exhaust gas temperature, sensor 43 for urea level in vessel 30, and sensor 44 for the temperature of the urea solution in return line 33. Engine load, as represented by one or more suitable parameters, such as fuel flow, engine speed, throttle position or injection system settings, is a key parameters, and one of these or like factor can be monitored to determine the amount of $NO_x$ being generated and the need for reagent feed to the heating unit or its hydrolysis products fed to the exhaust gases. Optional sensors, such as sensor 45 for residual $NO_x$ concentrations, can be employed for feedback control to the extent that such is practical. The Figure also shoves in dotted lines operation signals being sent to the controller and control signals being sent to controlled devices.

The temperature of the urea solution Throughout the system is maintained at a value sufficiently low that it is not permitted sufficient time at elevated temperature to hydrolyze the urea to such an extent that solids precipitate (e.g., below about 140° C. ). The injector 32 will tend to heat up as the temperature of the exhaust gases rises after startup to within the range of from about 300° to about 650° C. at high load for some engines. Unless precautions are taken, the high temperature will cause hydrolysis of the urea before injection—causing the hydrolysis products to precipitate due to their lower solubility than urea. The invention circulates the urea solution continuously from vessel 30 through lines 31 and 33 (and associated lines, as controlled) to provide cooling to the injector. It is practical with suitable controls to let the temperature of the solution rise to between 105° C. and 130° C. when the system is pressurized to the saturated vapor pressure for the temperatures involved. Because the residence time on the spill line is short, the urea solution may be allowed to reach higher temperatures without reaching the solubility limit for hydrolysis products. An auxiliary heating means (not shown) can be employed in the vessel 30 or elsewhere in the feed return system to achieve a desired temperature.

It is a distinct advantage of the invention that no air is required to achieve temperature control—saving on equipment costs and obviating reduced efficiency due to the cooling effect of the air on the exhaust gases. It is also an advantage of the invention that high-pressure injector equipment with a return line can be designed for operating pressures high enough to effect atomization, preferably with at least some gasification, of the urea solution upon release of pressure. This feature better enables close coupling of the injector with the SCR reactor 34.

In another embodiment, however, the return lines 33 and 33' are not employed or are not the sole means for temperature maintenance. In this embodiment, heat exchange fluid such as air or engine coolant can be passed in heat exchange contact with the injector. Permissibly, in this embodiment, the temperature of the urea solution can be allowed to rise above 100° C. as long as the urea solution is maintained at a pressure above the saturation vapor pressure at the temperature.

The SCR catalyst used is one capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art known supports can also be used.

Among the useful SCR catalysts are those representative prior art processes described below. Selective catalytic reduction processes for reducing $NO_x$ are well known and utilize a variety of catalytic agents. For instance, in European patent application WO 210,392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220 to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori et al. in U.S. Pat. No. 4,107,272 discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent to which the urea has been introduced is preferably passed over the SCR catalyst while the effluent is at a suitably high temperature, typically between about 180° C. and about 650° C., e.g., at least about 300° C. In this manner, the active species present in the effluent due to hydrolysis and gasification of the urea solution most effectively facilitates the catalytic reduction of nitrogen oxides. The effluent will contain an excess of oxygen. Use of the present invention with any of the above SCR catalysts (the disclosure of which are specifically incorporated by reference) reduces or eliminates the requirement for the transport, storage and handling of large amounts of ammonia or ammonium water.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

What is claimed is:

1. A method for reducing the emissions of $NO_x$ in an exhaust gas from a lean-burn engine, comprising:

monitoring the quality, temperature and level of urea solution in a storage vessel;

generating sensor signals representative of the quality, temperature and level of urea in the storage vessel;

comparing the sensor signals to reference values;

generating control signals representative of the results of the comparison;

responsive to the control signals, controlling the flow of urea solution to the exhaust gas; and passing the exhaust gas through an SCR reactor.

2. A method according to claim 1, wherein other parameters, including pressure in the vessel and/or feed lines are also monitored and employed to facilitate control.

3. A method according to claim 1, wherein at least one of the control parameters is processed by a dedicated signal processor.

4. A method according to claim 1, wherein at least one of the control parameters is processed by a main engine control unit and comparisons made there are to a comprehensive engine parameter map.

5. A method according to claim 1, wherein a heater is provided within the storage vessel for temperature maintenance of the urea solution upon receiving control signals.

6. A method according to claim 1, wherein a return line is provided from the injector back to the storage vessel to maintain the temperature of the urea solution within predetermined limits.

7. A method according to claim 1, wherein a control signal is generated responsive to an excessively low temperature for the urea in the storage vessel starts a heater to maintain the temperature of the solution within a desired range.

8. A method according to claim 7, wherein the availability of battery power to run the heater is monitored and if it determined that insufficient battery power is available, injectors and feed lines will be drained to avoid freezing.

9. A method according to claim 8, wherein a warning to the operator is provided and control engine operation is controlled to maintain low $NO_x$ levels without the use of reagent by exhaust gas recirculation, engine timing or derating to produce less power.

10. A method according to claim 1, wherein the quality of the urea solution is monitored and if it fails testing on one or more criteria, the injectors and feed lines will be drained to prevent operation with a defective solution.

11. A method according to claim 10, wherein responsive to a control signal representative of a defective solution, a warning is provided to the operator and engine operation is controlled to maintain low $NO_x$ levels without the use of reagent, by exhaust gas recirculation, engine timing or derating to produce less power.

* * * * *